United States Patent [19]

Sattler

[11] 4,317,858
[45] Mar. 2, 1982

[54] ULTRAVIOLET CURABLE SOLVENT-FREE WIRE ENAMEL BLENDS

[75] Inventor: Frank A. Sattler, Monroeville, Pa.

[73] Assignee: Westinghouse Electric Corp., Pittsburgh, Pa.

[21] Appl. No.: 163,899

[22] Filed: Jun. 27, 1980

[51] Int. Cl.³ .................. B32B 15/08; C08F 283/04; C08L 61/34; C08L 79/08

[52] U.S. Cl. .............................. 428/379; 204/159.15; 204/159.16; 204/159.17; 204/159.19; 525/423; 525/424; 525/440; 525/488; 525/530; 525/920; 525/921; 525/922

[58] Field of Search .................. 428/379; 204/159.16, 204/159.19, 159.17, 159.15; 525/488, 424

[56] References Cited

U.S. PATENT DOCUMENTS

| | | | |
|---|---|---|---|
| 3,673,140 | 6/1972 | Ackerman et al. | 204/159.19 |
| 4,140,605 | 2/1979 | Sano et al. | 204/159.16 |
| 4,260,703 | 4/1981 | Hodakowski et al. | 204/159.16 |
| 4,268,659 | 5/1981 | Bederke et al. | 204/159.16 |

*Primary Examiner*—John C. Bleutge
*Assistant Examiner*—A. H. Koeckert
*Attorney, Agent, or Firm*—R. D. Fuerle

[57] ABSTRACT

Disclosed is a wire enamel blend which is curable to the B-stage with UV light then to the C stage with heat. The blend comprises up to about 40% of an acrylated epoxy dissolved in a monoacrylate, about 2 to about 26% of an acrylated polybutadiene, about 3 to about 26% of an acrylated polyester-amide-imide dissolved in a monoacrylate and in an unsatured diester, about 30 to about 65% of an end-blocked urethane dissolved in a monoacrylate and hydroxy terminated unsaturated diesters, up to about 15% of a cresol formaldehyde dissolved in monoacrylates, about 1.5 to about 5% of a UV photoinitiator, up to about 5% of an acrylated methoxymethyl melamine, and up to about 0.1% of a flow control agent.

23 Claims, No Drawings

ULTRAVIOLET CURABLE SOLVENT-FREE WIRE ENAMEL BLENDS

BACKGROUND OF THE INVENTION

Solventless wire enamels are desirable from the standpoint of protection of the environment and the saving of energy required for curing. However, solventless wire enamels which are cured with heat alone can volatilize a high percentage of the monomer. This occurs even when highly non-volatile monomers such as trimethylolpropane triacrylate and tetraethylene glycol diacrylate are used due to the very high temperatures required for the very fast cure times effected in a normal wire enamel coating operation. In an ultraviolet (UV) curing operation on the other hand, the monomers are polymerized very rapidly without excessive heating and little or no monomer is volatilized.

Acrylic monomer formulations have been made which can be cured readily with ultraviolet radiation, but these have shown definite shortcomings when used as wire enamels. Also, acrylated epoxies, urethanes, and polyesters have been adapted to UV curing with similar shortcomings, particularly a poor combination of thermoplastic flow and heat shock resistance.

SUMMARY OF THE INVENTION

I have found that a UV-curable wire enamel can be prepared with good properties, particularly for use in oil-filled transformers, by blending the proper proportions of: (1) an acrylated epoxy dissolved in an unsaturated monomer; (2) an acrylated polybutadiene; (3) an acrylated polyester-amide-imide dissolved in an unsaturated monomer and in an unsaturated diester; (4) an end-blocked urethane dissolved in an unsaturated monomer and in hydroxy-terminated unsaturated diesters; (5) cresol formaldehyde resin dissolved in an unsaturated monomer and an acrylated hexamethoxy methyl melamine dissolved in a monomer; and (6) a UV photoinitiator.

The wire enamel blend of this invention is solventless and therefore does not require energy to volatilize a solvent or to burn the solvent once it is volatilized. Also, only one to three coats are required for an adequate build using the wire enamel blend of this invention, while six to eight coats are required for solvent-containing wire enamel blends.

DESCRIPTION OF THE INVENTION

The wire enamel blend of this invention is a liquid mixture of at least four components, an acrylated polybutadiene, an acrylated polyester-amide-imide dissolved in an unsaturated monomer and in an unsaturated diester, and end-blocked urethane dissolved in unsaturated monomer and in hydroxy-terminated unsaturated diesters, and a UV photoinitiator. Optional ingredients may also be added to the wire enamel blend. The blend contains no water and no solvent.

PREPARATION OF ACRYLATED EPOXY DISSOLVED IN AN UNSATURATED MONOMER

The first component of the wire enamel blend of this invention is an acrylated epoxy dissolved in an unsaturated monomer. This component is prepared in two steps. The first step consists of the acrylation of trimellitic anhydride (TMA). The TMA is acrylated with any hydroxy acrylate, such as, for example, 3-hydroxy propyl acrylate or 2-hydroxy ethyl acrylate. The latter is preferred as it is inexpensive and readily available. It is preferable to use 100% TMA (all percentages herein are by weight unless otherwise noted), but a dianhydride such as pyromellitic dianhydride or benzophenone tetracarboxylic dianhydride may be substituted for up to about 10% of the TMA if desired. Dianhydrides are not preferred because they result in more cross-linking which reduce heat shock. To prepare the acrylated TMA, one mole of the hydroxy acrylate is reacted with one mole of TMA. That is, the reaction is stoichiometric but 10% excess of either component may be used. No catalyst is needed in this reaction but an inhibitor such as benzoquinone is added to prevent polymerization of the hydroxy acrylate. The hydroxy acrylate is simply heated with the TMA until an acid number of approximately 364 is reached. Generally, this takes about an hour and a half at 120° C. The hydroxy group of the hydroxy ethyl acrylate reacts preferentially with the anhydride group of the TMA, leaving two free carboxyl groups to react with the epoxy.

To prepare the acrylated epoxy, the completed TMA ester is reacted with an epoxy resin. Cycloaliphatic epoxies can be used but bisphenol A epoxies are preferred as they give superior properties. The bisphenol A epoxy resin should have an epoxy equivalent weight (EEW) of greater than 1000 in order to achieve good wire properties. One mole of the acrylated TMA is reacted with two moles of the epoxy in the presence of an unsaturated monomer to form a solution of about 40 to about 70% acrylated epoxy and about 30 to about 60% unsaturated monomer. Suitable unsaturated monomers for use in this invention include phenoxyethyl acrylate, ethoxyethyl acrylate, N-vinyl pyrrolidone, styrene, vinyl acetate, and dicyclopentadiene acrylate. About 0.02 to about 0.2% of an inhibitor should be dissolved in the unsaturated monomer to prevent polymerization. At least 80% of the unsaturated monomer in the overall blend is preferably monoacrylate. Phenoxyethyl acrylate is preferred as it dissolves the epoxy the best and has good reactivity. This reaction is also stoichiometric, i.e., two epoxy groups per carboxy group, but up to about 10% excess of either component may be used. It is preferable to include up to 1% of a catalyst such as a tertiary amine (e.g., benzyl dimethylamine or triethanolamine). The reaction proceeds until an acid number of less than about 8 is achieved. Generally, this requires about 100 minutes at 140° to 150° C.

PREPARATION OF ACRYLATED POLYBUTADIENE

The acrylated polybutadiene is prepared in two steps. In the first step, a diisocyanate is reacted with a hydroxy acrylate to prepare an acrylated isocyanate. In this reaction a diisocyanate, preferably an aromatic diisocyanate, is used. Suitable diisocyanates include toluene diisocyanate, m-phenylene diisocyanate, hexamethylene diisocyanate, and 4,4'-diisocyanato diphenylmethane. The preferred diisocyanate is toluene diisocyanate, which is a mixture of the 2,4 and 2,6 isomers, because it is inexpensive and readily available.

Suitable hydroxy acrylates include 3-hydroxy propyl acrylate and 2-hydroxy ethyl acrylate. The latter is preferred as it is readily commercially available. The diisocyanate and the hydroxy acrylate are reacted in equimolar proportions, i.e., one hydroxyl group per two isocyanate groups. The reaction to produce the acrylated isocyanate occurs at room temperature but it is preferable to heat at 60° for about 30 minutes to make certain the reaction is complete.

The acrylated polybutadiene is then prepared by reacting the acrylated isocyanate with hydroxy-terminated polybutadiene. The hydroxy-terminated polybutadiene should have a molecular weight of about 1000 to about 3000. One mole of the acrylated isocyanate is reacted for each mole of the hydroxy-terminated polybutadiene, (one isocyanate equivalent per two hydroxy equivalents) although up to about a 10% excess of either ingredient may be used. The reaction is run without a catalyst until an infrared test of a sample determines that no isocyanate is present. Generally this requires about one-half hour at 140° C.

PREPARATION OF ACRYLATED POLYESTER-AMIDE-IMIDE DISSOLVED IN UNSATURATED MONOMER AND AN UNSATURATED DIESTER

The preparation of the polyester-amide-imide proceeds in steps beginning first with the preparation of a polyester. The polyester is prepared by reacting a polyol with a dicarboxylic acid. The polyol is a compound which has at least two hydroxy groups. Preferably diols are used but up to about 10% of triol, such as glycerol, trimethylol propane or tris (2-hydroxy ethyl) isocyanurate, may also be used. Suitable diols include ethylene glycol, triethylene glycol, 1,4-butane diol, and neopentyl glycol. Preferably mixtures of diols and triols are used to break up the crystallinity and give a lower viscosity.

The dicarboxylic acid that is reacted with the polyol to produce the polyester may include up to about 10% of a tricarboxylic acid such as trimellitic acid. Also, either the acid itself may be used or lower alkyl esters, up to $C_6$, but neither the acid or the ester form is preferred over the other. However, the dicarboxylic acid is preferably aromatic although up to 10% of it may be aliphatic. The preferred dicarboxylic acid is terephthalic acid or its alkyl ester up to $C_6$. The methyl ester is preferred as it is less expensive. Isophthalic acid or its alkyl ester may also be used. The polyol is reacted with the dicarboxylic acid using about 50 to about 100% excess polyol over stoichiometric. About 0.1 to about 0.5%, based on the total polyester weight, of a catalyst is needed to make the reaction proceed. Polyester catalysts are well known in the art and dibutyltin oxide catalyst is preferred since it effects esterification at a relatively low temperature. Other catalysts which may be used for esterification include dihydroxy butyl tin chloride ($C_4H_9ClSn(OH)_2$) and butyl stannoic acid ($C_4H_9SnOOH$). Catalysts for ester interchange of the acid esters include butyl titanate, isopropyl titanate and litharge. The reaction of the polyol and the dicarboxylic acid or ester should proceed to clarity which generally requires heating from 180° C. to 230° C. in 15° C. increments per hour.

In the next reaction the polyester is reacted with a diamine and trimellitic anhydride to prepare a polyester-amide-imide. The diamine is preferably aromatic. Suitable examples include m-phenylene diamine and methylene dianiline. The preferred diamine is m-phenylene diamine as it gives a better product. Equimolar proportions of diamine and TMA are used although either the diamine or the TMA may be in excess up to about 10%. About 2.25 to about 2.75 moles of the TMA are used per mole of the dicarboxylic acid that was used in preparation of the polyester. The reaction of the TMA, the diamine, and the polyester can be conducted at about 190° with a 10° C. increase in temperature per hour to 230° C. plus an additional two hours at 230° C. The product is then cooled and are acrylated.

The polyester-amide-imide is acrylated by reacting it dissolved in an unsaturated monomer with an acrylated isocyanate. The monomer must be a UV reactive monomer. Acrylic monomers are preferred as they polymerize well with UV light. Suitable examples include phenoxyethyl acrylate, ethoxyethyl acrylate, and dicyclopentadiene acrylate. Phenoxyethyl acrylate is preferred since it is a good solvent and gives good wire properties. Styrene, vinyl acetate, and N-vinyl pyrrolidone can also be used as a monomer in minor quantities. In addition, up to 10% by weight of the monomer may be a diacrylate although preferably no diacrylate is present. Another monomer that can be used is an ester prepared by reacting triethylene glycol with maleic anhydride in a ratio of two moles of triethylene glycol to one mole of maleic anhydride. This reaction can be conducted at about 180° C. with a 10° C. increase per hour to 215° C. followed by heating at 215° C. until 18 milliliters of water (theoretical volume) condenses out. The monomer is preferably a mixture of this ester with phenoxyethyl acrylate in a weight ratio of 1:1 to about 2:1. The reaction proceeds in the acrylate monomer and the ester is added at the end of the reaction.

The acrylated isocyanate that is used to prepare the acrylated polyester-amide-imide can be the same type of acrylated isocyanate that was previously described in connection with the preparation of the acrylated polybutadiene. Sufficient acrylated isocyanate is used to react with about 25 to 100% of the free hydroxyls in the polyester-amide-imide. The amount of monomer that is used should be about 35 to about 60% of the total weight of the polyester-amide-imide, the monomer, and the acrylated isocyanate. The polyester-amide-imide is first dissolved in the acrylic monomer. About 0.05 to about 0.5% based on the total weight of the solution of an inhibitor such as benzoquinone should be added to the acrylic monomer prior to its addition to the polyester-amide-imide in order to prevent its polymerization. Then the acrylated isocyanate is added and the mixture is heated for one-half hour at 140° C. The diester is then added if it is used and the mixture is cooled.

PREPARATION OF END-BLOCKED URETHANE DISSOLVED IN UNSATURATED MONOMER

This component is prepared in two parts, Part A and Part B.

Part A

Part A requires the reaction of an ester and end-blocked isocyanate. The ester is prepared by the reaction of a polyol with maleic anhydride or terephthalic acid or isophthalic acid or esters thereof. Suitable polyols include triethylene glycol, 1,4-butanediol, propylene glycol, and neopentyl glycol. The preparation of this ester was previously described as part of the unsaturated monomer used in preparing the acrylated polyester-amide-imide.

The end-blocked urethane is prepared in two steps. First, a diisocyanate is reacted with an end blocker. The preferred diisocyanate is toluene diisocyanate although m-phenylene diisocyanate, hexamethylene diisocyanate, or 4,4'-diisocyanato diphenyl methane could also be used. The end blocker is a compound which blocks the isocyanate groups and then unblocks later when heat is applied. Caprolactam and m,p-cresol are suitable end blockers. They are used in equimolar proportions with the diisocyanate (leaving one isocyanate group unblocked) and are heated with it to 100° C. to produce the end-blocked isocyanate. The ester and the end-blocked diisocyanate are reacted in a ratio of one mole end-blocked diisocyanate to 1 mole of ester. Generally, this requires heating for one hour at about 120° to 125° C.

That product is then dissolved in an unsaturated monomer. Acrylic monomers are preferred as they produce better products, but N-vinyl pyrrolidone can also be used. Suitable acrylic monomers include phenoxyethyl acrylate, ethoxyethyl acrylate, and dicyclopentadiene acrylate. Up to about 25% of the monomer may be styrene. The ratio of the urethane to monomer can be about 2:1 to about 1:1 by weight.

PART B

In part B one mole of the diol is reacted with two moles of the blocked diisocyanate and dissolved in the monomer. The difference between Part A and Part B is that in Part A an ester is used, and in Part B a polyol is used to react with the blocked isocyanate. In Part A, a chain is produced which consists of hydroxy-diol-dicarboxylic acid-diol-toluene diisocyanate-end blocker. In Part B, a chain is produced which consists of end-blocker-toluene diisocyanate-diol-toluene diisocyanate-end blocker. Part A and Part B are mixed in a weight ratio of about 2:1 to about 1:2.

UV PHOTOINITIATOR

A UV photoinitiator is also required in the composition to initiate polymerization under UV light. UV photoinitiators are benzoin ethers and trademarked products that are commercially available. Some materials which satisfactorily photocure these blends are "Vicure 10" and "Vicure 30" photoinitiators (Stauffer Chemical) and "Igacure 651" photoinitiator (Ciba-Geigy).

PREPARATION OF LOW MOLECULAR WEIGHT CRESOL-FORMALDEHYDE RESIN DISSOLVED IN UNSATURATED MONOMER

This ingredient is prepared from five components. The first is m,p-cresol or a resin grade cresylic acid. The second is formaldehyde in water which is usually 60% water and 40% formaldehyde. The third is a suitable catalyst such as triethanolamine. The fourth is salicylic acid which neutralizes the catalyst. The fifth is an unsaturated monomer which may be an acrylate or N-vinyl pyrrolidone. The m,p-cresol or resin grade cresylic acid, the formaldehyde in water, and the catalyst are heated to reflux for about an hour. The salicylic acid is then added and the mixture is heated for 60 to 90 minutes at 50 millimeters of mercury to remove the water. The mixture is then dissolved in the monomer. About 1.25 to about 1.5 moles of m,p-cresol or resin grade cresylic acid is used per mole of formaldehyde. About 0.5 to about 2% of catalyst is used based on the cresol formaldehyde. About 0.5 to about 2% salicylic acid is used based on the total composition, and about 10 to about 20% unsaturated monomer is used.

PREPARATION OF ACRYLATED "CYMEL"

An optional ingredient of the wire enamel blend of this invention which may be used in place of the cresol formaldehyde resin is an acrylated hexamethoxymethyl melamine. It is prepared in two steps.

In the first step, a diisocyanate such as those described previously, preferably toluene diisocyanate, is reacted with a hydroxy acrylate. The preferred hydroxy acrylate is 2-hydroxyethyl acrylate. Equimolar proportions of the diisocyanate and the hydroxy acrylate are used. The reaction proceeds at 60° C. and is complete in about an hour. No catalyst is needed. The product is an acrylated urethane having a free isocyanate group.

The acrylated urethane is then reacted with hexamethoxymethyl melamine (TRADEMARK "Cymel"), in a ratio of two moles acrylated urethane to one mole of Cymel±50% to produce an acrylated Cymel. About 0.05 to 0.5% by weight of an inhibitor such as benzoquinone should be present during the reaction to prevent polymerization of the acrylate. The reaction may be performed by heating at 120° to 125° C. for about one-half hour. About 15 to about 30% of an unsaturated monomer is then added to reduce viscosity.

PREPARATION OF THE WIRE ENAMEL BLEND

The wire enamel blend of this invention comprises up to about 40% of the acrylated epoxy component, about 2 to about 26% of the acrylated polybutadiene component, about 3 to about 26% of the acrylated polyester-amide-imide component, about 30 to about 65% of the urethane component, up to about 15% of the cresol formaldehyde component, about 1.5 to about 5% of a UV photoinitiator, up to about 5% of acrylated Cymel, and up to about 0.1% by weight of a flow control agent. The flow control agent is optional but is preferably present. Fluorocarbons are usually used as flow control agents.

If the wire enamel blend is to be used in sealed oil-filled transformers it preferably consists of about 25 to about 40% of the acrylated epoxy component, about 2 to about 10% of the acrylated polybutadiene component, about 3 to about 15% by weight of the acrylated polyester-amide-imide component, about 30 to about 50% of the urethane component, up to about 15% of the cresol formaldehyde component, about 1.5 to about 5% of the UV photoinitiator, up to about 5% of acrylated Cymel, and about 0.03 to about 0.1% of the flow control agent.

If the wire enamel blend is to be used for general purposes, it comprises about 6 to about 26% of the acrylated polybutadiene component, about 6 to about 26% of the acrylated polyester-amide-imide component, about 40 to about 65% of the urethane component, up to about 15% of the cresol formaldehyde component, about 1.5 to about 5% of the UV photoinitiator, up to about 5% of acrylated Cymel, and about 0.03 to about 0.1% of the flow control agent.

The wire enamel can be used on any type of wire. Copper or aluminum wire is preferred as those metals are commonly used. The wire may be rectangular or round and of any size and shape. The wire is passed through the wire enamel blend and the blend which adheres to the wire is then exposed to ultraviolet light. About 12 inches of lamp at about 200 watts per inch on both sides of the wire has usually been found to be adequate. The wire then passes through a curing tower which is heated at about 300° C. A typical curing tower is about 12 feet long with the residence time of about 15 to about 35 seconds. The amount of UV light used and the temperature of cure depends on the particular components used in the blend and their concentration as well as on the wire speed. A typical wire speed is about 20 to about 50 feet per minute.

The following examples further illustrate this invention.

EXAMPLE 1

Part A

Part 1—Preparation of Acrylated TMA

To a 1 liter reaction flask equipped with a motorized stirrer, thermometer, nitrogen sparge tube, and a heating mantle, the following ingredients were charged 384.2 grams trimellitic anhydride (2.0 moles), 232.0 grams 2-hydroxy ethyl acrylate (2.0 moles), and 5.36 grams benzoquinone. The ingredients were heated one and one-half hours at 120° C. to an acid number of 361 and then cooled. The yield was 621 grams.

Part 2—Preparation of Acrylated Epoxy

To a reaction flask equipped as in Part A was added 225.0 grams of bisphenol A epoxy having an epoxy equivalent weight of 2000 to 2500 sold by Shell Chemical Company under the trademark "Epon 1007," 232.0 grams phenoxyethyl acrylate, 2.0 grams triethanolamine, and 7.7 grams of Part 1. The mixture was dissolved at 100° C. and reacted at 140° to 150° C. for an hour and a half. The yield was 467 grams.

Part B, Part 1—Preparation of Ester

To a one liter reaction flask with nitrogen sparging was added 300.2 grams triethylene glycol (2.0 moles) and 98.1 grams maleic anhydride (1.0 moles). Reaction was performed at 180° C. increasing to 215° C. at 10° C. per hour temperature increments and the reaction was continued at 215° C. until 15 milliliters of water had condensed out. The charge cooled to 60° C. for the addition of Part 2.

Part 2—Preparation of End-Blocked Isocyanate

To a 400 milliliter beaker was charged 174.1 grams toluene dissocyanate (1.0 moles), (a mixture of 80% of the 2,4 isomer and 20% of the 2,6 isomer), and 113.1 grams epsilon caprolactam (1.0 moles). The mixture was heated to 100° C. for an hour and a half to yield 290.2 g. of Part 2. It was cooled to 60° C. and added rapidly to Part 1. The new mixture was reacted at 120° C. to 125° C. for a half-hour and cooled. The yield was 660 grams of Part B.

Part C—Preparation of End-Blocked Urethane

To a two liter reaction flask with nitrogen sparging was added 522.3 grams toluene diisocyanate (3.0 moles), 162.2 grams m,p-cresol (1.5 mols), and 169.7 grams caprolactam (1.5 moles). The mixture was heated to 100° C. and cooled and 225.2 grams triethylene glycol (1.5 moles) was added with the exotherm temperature held below 120° C. The mixture was reacted for one hour at 120° to 125° C., and 242.1 grams phenoxyethyl acrylate, 1.62 grams benzoquinone, 60.6 grams styrene, and 231.0 grams Part 1 of Part B were added. The yield was 1614 grams of Part C.

Part D—Preparation of Acrylated Polybutadiene

To a 400 milliliter beaker was added 11.34 grams toluene diisocyanate and 7.56 grams 2-hydroxy ethyl acrylate. The mixture was heated at 60° C. for 30 minutes, and 0.135 grams benzoquinone and 250 grams hydroxy-terminated polybutadiene having a molecular weight 3000 and 0.52 milliequivalents of hydroxy groups per gram (sold by Nippon Soda Company under the trademark "Hystil G 3000") were added. The mixture was reacted for one-half hour at 140° C. and cooled.

Part E, Part 1—Preparation of Acrylated Isocyanate

To one liter flask with nitrogen sparging was added 394.8 grams toluene diisocyanate (2.27 moles), and 263.5 hydroxy ethyl acrylate (2.27 moles). The mixture was reacted at 60° C. for one hour with stirring. It was cooled and saved for reaction with Part 2.

Part 2—Preparation of Acrylated Polyester-Amide-Imide

To a three liter reaction flask equipped with a motorized stirrer, nitrogen sparge tube, thermometer, and heating mantle was added 44.7 grams ethylene glycol, 314.7 grams triethylene glycol, 31.6 grams 1,4-butanediol, 36.6 grams neopentyl glycol, 1.4 grams dibutyl tin oxide, and 126.5 grams terephthalic acid. The temperature was increased from 180° to 230° C. at 15° C. per hour and was reacted to clarity at 230° C. Then 205.0 grams m-phenylene diamine and 365.0 grams trimellitic anhydride were added. The mixture was reacted at 190° to 230° C. at a temperature increase of 10° C. per hour plus an additional two hours at 230° C. The mixture was cooled and dissolved into 436.4 grams phenoxyethyl acrylate into which 2.9 grams benzoquinone had been dissolved. Part 1 was then added and the entire mixture was reacted for one-half hour at 140° C. Then 800 grams of Part 1 of Part B was added and the mixture was cooled. The yield was 2895 grams of Part E.

Part F—Preparation of Low Molecular Weight Cresol Formaldehyde Resin

To a two liter reaction flask equipped with a reflux condenser was added 1144.0 grams m,p-cresol, 596.0 grams 40% aqueous formaldehyde, and 22.4 grams triethanolamine. The mixture was heated at reflux for one hour and then 20.8 grams salicyclic acid was added. The mixture was heated at 60° to 90° C. at a pressure of 50 millimeters of mercury until a Gardner viscosity of Z-4 was obtained. Then 215.3 grams phenoxyethyl acrylate was added and the mixture was cooled. The yield was 1474.3 grams of Part F.

Preparation of Final Blend

The final blend was prepared by mixing 36.7% Part A (acrylated epoxy), 29.5% Part B (end-blocked urethane), 15.8 Part C (end-blocked urethane), 4.0% Part D (acrylated polybutadiene), 4.0% Part E (acrylated polyester-amide-imide), 4.2% Part F (cresol formaldehyde resin), 3.7% benzoin ether photoinitiator sold by Stauffer Chemical Company under the trademark "Vicure 10," 1.0% urethane activator sold by Abbot Laboratories under the trademark "Polycat 41," 1.0% epoxy catalyst from Minnesota Mining and Manufacturing sold under the trade designation "L4368," and 0.07% fluorocarbon flow control agent sold by Minnesota Mining and Manufacturing Company under the trade designation "FC430." The blend had a viscosity of approximately 300,000 cps at 25° C. It was coated on #17 AWG aluminum wire using solid bullet dies. After the die application, the enamel was cured in an ultraviolet oven containing two UV lights, one foot in length at 200 watts per inch. The lamps were parallel to the wire, one on each side of the wire. After the UV cure, the wire traveled through a 12 foot heating tower with the bottom zone at 200° C. and the top zone at 300° C. Two coats of enamel were applied and the properties of enameled wire are shown in the table which follows. Good smoothness, flexibility, heat shock resistance, electrical strength, and cut through temperature were obtained. In addition, a simulated sealed transformer test was run in which twisted pairs of the enamel wire were sealed with transformer oil, transformer paper, and steel, and aged for four weeks at 150° C. The enamel wire retained 100% of its original electrical strength along with satisfactory physical properties. Similar coatings of this material on #18 AWG copper wire gave properties comparable to the aluminum wire except that the heat shock resistance was better, passing a 15% plus 3X heat shock at 200° C.

TABLE I

Properties of Example I on #17 A.W.G. Aluminum Wire-Dies 49.5 and 50.7 mils

| Property | | |
| --- | --- | --- |
| Wire speed, ft/min | 15 | 20 |
| No. passes | 2 | 2 |
| UV lamp | Two-200 watts/inch | |
| Tower temp., °C. | [300° C. Top | 200° C. Bottom] |
| Overall diam., mils | 48.1–48.5 | 48.3–48.6 |
| Bare wire diam. mils | 44.7–44.8 | 44.7–44.8 |
| Build, mils | 3.4–3.7 | 3.6–3.8 |
| Smoothness | Smooth | Smooth |
| Quick snap | Passes | Passes |
| Elong. + 1X, % | Snap + 1X | Snap + 1X |
| Heat shock - 175° C. | 15% + 3X | 15% + 3X |
| Electric strength, kV | 6.0–9.0 | 7.0–8.5 |
| Cut-through temp., °C. | 340 | 310 |
| Repeated abrasion, strokes (750 g weight) | 4–5 | 4–5 |

EXAMPLE 2

Part A

This is the same composition and procedure as Part A of Example 1 except that the 232.0 grams phenoxyethyl acrylate were replaced by a mixture of 116.0 grams ethoxyethyl acrylate and 116.0 grams dicyclopentadiene acrylate.

Part B

This is the same material as Part B of Example 1.

Part C

This is the same procedure and composition as Part C of Example 1 except that 242.1 grams of phenoxyethyl acrylate were replaced by 242.1 gram of dicyclopentadiene acrylate and the styrene was eliminated.

Parts D, E, and F

These are the same as in Example 1.

The final composition consisted of 31.8% Part A, 25.4% Part B, 27.3 Part C, 3.5% Part D, 3.5% Part E, 3.7% Part F, 3.2% "Vicure 10," 0.79% "Polycat 41," 0.79% "L4368," and 0.06% "FC430." The properties of the blend are shown in the table which follows. Good smoothness, flexibility, heat shock, and cut through resistance were obtained.

EXAMPLE 3

Part A

This is the same as Part A of Example 1 except that the 232.0 grams of phenoxyethyl acrylate was replaced by dicyclopentadiene acrylate.

Parts B, C, and D

These are the same as in Example 2.

Part E

This is the same as Part 1 of Part B of Example 1.

The blend consisted of 23.2% Part A, 15.0% Part B, 30.6% Part C, 8.1% Part D, 12.3% Part E, 7.7% ethoxyethyl acrylate, 2.0% "Vicure 10," 0.5% "Polycat 41," 0.5% "L4368," and 0.03% "FC430." The properties of the blend are shown in the table which follows. Good smoothness, flexibility, heat shock, electric strength, and cut through resistance were obtained.

EXAMPLE 4

A blend was prepared from 56.8% Part C of Example 2, 15.2% Part D of Example 1, 22.7% Part 1 of Part B of Example 1, 3.8% "Vicure 10," 1.0% "Polycat 41," 0.08% "FC430," and 0.47% tertiary butyl perbenzoate. The properties of this blend are shown in the table which follows. It did not pass the sealed transformer test, but had good properties for a general purpose class 105° C. or 130° C. wire enamel and was very low in monomer and material costs. The fact that such a low monomer content (8.9% dicyclopentadiene acrylate) can be used satisfactorily in the UV plus heat approach was considered to be very surprising.

EXAMPLE 5

Part A

To a 300 milliliter beaker was added: 65.0 grams Cymel 303 (hexamethoxymethyl melamine obtained from American Cyanamid), 96.7 grams Part 1 of Part E of Example 1, and 0.2 grams benzoquinone. The mixture was reacted for one-half hour at 120° to 125° C. and 40.4 grams phenoxyethyl acrylate was added. The yield was 202 grams of Part A.

The blend was prepared by mixing 3.67% Part A—acrylated Cymel, 61.6% Part C of Example 1, 15.3% Part D of Example 1, 15.3% Part E of Example 1, 3.7% "Vicure 10," 0.5% tertiary butylperbenzoate, and 0.08% "FC430." The properties of this blend coated on #17 AWG aluminum wire are shown in the table which follows. An improvement in abrasion resistance was obtained along with other desirable properties.

EXAMPLE 6

Part A

This is the same as Part A of Example 1 except that the 232.0 grams of phenoxyethyl acrylate is replaced by a mixture of 155.7 g. of phenoxyethyl acrylate and 115.2 g. dicyclopentadiene acrylate.

Part B—Preparation of End-Blocked Urethane

This is the same as the reaction of Part C of Example 1 except that the 1.5 moles of triethylene glycol (225.2 g.) are replaced with 1.5 moles of 1,4 butanediol (135.2 g.).

Part C—Preparation of End-Blocked Urethane

To 143.5 g. of the product of Part 2 of Part B of Example 1 was added 45.0 g. of 1,4 butanediol in a 400 ml. beaker with constant stirring. The reaction was heated for one hour at 120° C., diluted wth 35.8 g. phenoxy ethyl acrylate, 39.6 g. dicyclopentadiene acrylate and 0.26 g. benzoquinone and cooled. The yield was 264 g.

Part D—Preparation of End-Blocked Urethane

The following ingredients were charged to a two-liter flask equipped with motor stirrer, nitrogen sparge and water-cooled doward condenser:

169.9 g. dimethyl terephthalate (0.875 m)
210.3 g. 1,4 butanediol (2.33 m)
1.75 g. tetraisopropyl titanate The ingredients were reacted at 180°–200° C. for two hours until 56 g. methanol was condensed out. At this point 28.5 g. (0.29 m) maleic anhydride was added and the reaction was continued at 150°–165° C. approximately 1½ hours until 5 g. water was condensed out. The reaction was diluted with 273.0 g. phenoxyethyl acrylate and 273.0 g. dicyclopentadiene acrylate and 1.75 g. benzoquinone and 335.1 g. of the reaction product of Part 2 of Part B of Example 1 was added. The reaction was continued for one hour at 120° C. and then cooled.

Part E—Preparation of End-Blocked Urethane

To a two-liter reaction flash similar to that of Part D were charged:

540.6 g. 1.4 butanediol (6.0 m)
294.3 g. maleic anhydride (3.0 m)
4.5 g. dibutyl tin oxide
3.0 g. benzyldimethyl amine The ingredients were reacted at 150°–165° C. for six hours to an acid number of 9.0. The reaction was cooled and 861.6 g. of the reaction product of Part 2 of Part B of Example 1 was added. The reaction was continued for one hour at 120° C. and 354.6 g. dicyclopentadiene and 2.0 g. benzoquinone were added and the product was cooled.

A blend of 26.4% Part A, 16.7% Part B, 18.6% Part C, 12.5% Part D, 6.2% Part E, 2.5% Part E of Example 1, 2.5% Part D of Example 1, 1.5% "Vicure 10", 7.8% vinyl acetate, 5.2% dicyclopentadiene acrylate and 0.04% "FC 430" was prepared. The solution viscosity was 29,000 cp. at 25° C. and the solution viscosity was still stable after three months at 25° C. in a 5-gallon plastic bucket. The properties on #17 AWG aluminum wire as shown in the table are very good. The wire also performed well in a sealed transformer test.

| | Example 2 | Example 3 | Example 4 | Example 5 | Example 6 |
|---|---|---|---|---|---|
| Wire speed, ft/min | 20 | 20 | 20 | 20 | 20 |
| No. passes | 3 | 2 | 2 | 2 | 3 |
| UV lamp | Two-200 watts/inch | | | | |
| Tower temp., °C. | 312/210 | 300/200 | 292/190 | 300/295 | 310/210 |
| Overall diam., mils | 48.0–48.3 | 47.9–48.3 | 47.9–48.2 | 47.7–48.2 | 47.7–48.1 |
| Bare wire diam., mils | 44.9–45.0 | 44.4–44.8 | 44.8–45.0 | 44.3–44.5 | 44.0–44.6 |
| Build, mils | 3.1–3.3 | 3.5 | 3.1–3.2 | 3.4–3.7 | 3.7–3.5 |
| Smoothness | Smooth | Smooth | Smooth | Smooth | Smooth |
| Quick snap | Passes | Passes | Passes | Passes | Passes |
| Elong. + 1X, % | Snap + 1X | Snap + 1X | Snap + 1X | Snap + 1X | Snap + 1X |
| Heat shock - 175° C. (% Elongation + mandrel) | 15% + 3X | 15% + 3X | 15% + 3X | 15% + 3X | 15% + 3X |
| Electric strength, kV | 6.5–8.0 | 5.0–7.0 | 6.0–8.0 | 5.6–7.4 | 8.3–10.8 |
| Cut-through temp., °C. | 288 | 307 | 299 | 280 | 205 |
| Repeated abrasion, strokes 750 g wt. | 4–8 | 4–5 | 2–4 | 10–11 | 7–8 |

I claim:

1. A wire enamel blend, curable to the B-stage with UV light followed by heat, comprising:
   (1) up to about 40% of an acrylated epoxy dissolved in unsaturated monomer;
   (2) about 2 to about 26% of an acrylated polybutadiene;
   (3) about 3 to about 26% of an acrylated polyester-amide-imide dissolved in unsaturated monomer and in an unsaturated diester;
   (4) about 30 to about 65% of an end-blocked urethane dissolved in unsaturated monomers and hydroxy-terminated unsaturated diesters;
   (5) up to about 15% of a cresol formaldehyde resin dissolved in unsaturated monomers;
   (6) about 1.5 to about 5% of a UV photoinitiator;
   (7) up to about 5% of an acrylated hexamethoxymethyl melamine; and
   (8) up to about 0.1% of a flow control agent.

2. A wire enamel blend according to claim 1 which comprises:
   (1) about 25 to about 40% of said acrylated epoxy;
   (2) about 2 to about 10% of said acrylated polybutadiene;
   (3) about 3 to about 15% of said acrylated polyester-amide-imide;
   (4) about 30 to about 50% of said end-blocked urethane;
   (5) up to about 15% of said cresol formaldehyde resin;
   (6) about 1.5 to about 5% of said UV photoinitiator;
   (7) up to about 5% of said acrylated hexamethoxymethyl melamine; and
   (8) about 0.03 to about 0.1% of said flow control agent.

3. A wire enamel blend according to claim 1 which comprises:
   (1) about 6 to about 26% of said acrylated polybutadiene;
   (2) about 6 to about 26% of said acrylated polyester-amide-imide;
   (3) about 40 to about 65% of said end-blocked urethane;
   (4) up to about 15% of said cresol formaldehyde resin;
   (5) about 1.5 to about 5% of said UV photoinitiator;
   (6) up to about 5% of said acrylated hexamethoxymethyl melamine; and (7) about 0.03 to about 0.1% of said flow control agent.

4. A wire enamel blend according to claim 1 wherein said acrylated epoxy is the reaction product of a bisphenol A epoxy resin and an acrylated trimellitic anhydride, where said acrylated trimellitic anhydride is the reaction product of trimellitic anhydride and a hydroxy acrylate.

5. A wire enamel blend according to claim 4 wherein said hydroxy acrylate is selected from the group consisting of 3-hydroxy propyl acrylate, 2-hydroxy ethyl acrylate, and mixtures thereof.

6. A wire enamel blend according to claim 1 wherein said acrylated hydroxy terminated polybutadiene is the reaction product of an acrylated isocyanate with hydroxy-terminated polybutadiene, where said acrylated isocyanate is the reaction product of a diisocyanate with a hydroxy acrylate.

7. A wire enamel blend according to claim 1 wherein said acrylated polyester-amide-imide is the reaction product of a polyester-amide-imide with an acrylated isocyanate dissolved in an acrylated monomer.

8. A wire enamel blend according to claim 7 wherein said monomer is selected from the group consisting of acrylic monomers, N-vinyl pyrrolidone, and mixtures thereof.

9. A wire enamel blend according to claim 8 wherein said acrylated isocyanate is the reaction product of a diisocyanate with a hydroxy acrylate.

10. A wire enamel blend according to claim 6 or 9 wherein said diisocyanate is toluene diisocyanate and said hydroxy acrylate is selected from the group consisting of 3-hydroxy propyl acrylate, 2-hydroxy ethyl acrylate and mixtures thereof.

11. A wire enamel blend according to claim 1 wherein said polyester-amide-imide is the reaction product of a polyester with a diamine and trimellitic anhydride.

12. A wire enamel blend according to claim 11 wherein said polyester is the reaction product of a polyol with a dicarboxylic acid.

13. A wire enamel blend according to claim 12 wherein said polyol is a mixture of a diol and a triol and said dicarboxylic acid is selected from the group consisting of terephthalic acid isophthalic acid, their alkyl esters up to $C_6$, and mixtures thereof.

14. A wire enamel blend according to claim 1 wherein said end-blocked urethane is a mixture of about one to about two parts by weight of the reaction product of an ester and an end-blocked isocyanate, dissolved in a monomer, with about one to about two parts by weight of the reaction product of an end-blocked isocyanate, with a compound selected from the group consisting of triethylene glycol, 1,4-butanediol, neopentyl glycol, and mixtures thereof, dissolved in a monomer.

15. A wire enamel blend according to claim 14 wherein said ester is the reaction of a polyol with a mixture of maleic anhydride and terephthalic anhydride.

16. A wire enamel blend according to claim 1 wherein at least 80% of said unsaturated monomer in said blend is monoacrylate.

17. A wire enamel blend according to claim 16 wherein said diisocyanate is toluene diisocyanate, said end blocker is selected from the group consisting of m,p-cresol, caprolactam, and mixtures thereof, and said monomer is selected from the group consisting of phenoxyethyl acrylate ethoxyethyl acrylate, dicyclopentadiene acrylate, and mixtures thereof.

18. A wire enamel blend according to claim 1 wherein said UV photoinitiator is a benzoin ether.

19. A wire enamel blend according to claim 1 wherein said cresol formaldehyde dissolved in monoacrylates is the reaction product of aqueous formaldehyde, a suitable catalyst, salicylic acid, and a compound selected from the group consisting of m,p-cresol, resin grade cresylic acid, or a mixture thereof.

20. A wire enamel blend according to claim 1 wherein said acrylated hexamethoxymethyl melamine is the reaction product of hexamethoxymethyl melamine with an acrylated urethane, where said acrylated urethane is the equimolar reaction product of a diisocyanate with a hydroxy acrylate.

21. A wire enamel blend according to claim 20 wherein said diisocyanate is toluene diisocyanate and said hydroxy acrylate is 2-hydroxyethyl acrylate.

22. A wire coated with a wire enamel blend according to claim 1, cured with UV light and heat.

23. A wire enamel blend, curable with UV light followed by heat, comprising:

I. up to 40% a solution of about 40 to about 65% of an acrylated epoxy dissolved about 35 to about 60% monoacrylate, said acrylated epoxy comprising the reaction product of
  A. a bisphenol A epoxy resin; and
  B. an acrylated trimellitic anhydride which comprises the reaction product of
    1. trimellitic anhydride; and
    2. a hydroxy acrylate;

II. about 2 to about 26% of an acrylated polybutadiene which comprises the reaction product of
  A. hydroxy terminated polybutadiene; and
  B. an acrylated isocyanate which comprises the reaction product of
    1. a diisocyanate; and
    2. a hydroxy acrylate;

III. about 3 to about 26% a solution of about 50 to about 70% of an acrylated polyester-amide-imide dissolved in about 30 to about 50% monoacrylate and unsaturated diester, where said acrylated polyester-amide-imide comprises the reaction product of
  A. a polyester-amide-imide which comprises the reaction product of
    1. trimellitic anhydride;
    2. a diamine; and
    3. a polyester which comprises the reaction product of
      a. a polyol; and
      b. a dicarboxylic acid; and
  B. an acrylated isocyanate which comprises the reaction product of
    1. a diisocyanate; and
    2. a hydroxy acrylate;

IV. about 30 to about 65% a solution of about 50 to about 60% of an end-blocked acrylated urethane dissolved in about 40 to about 50% monoacrylate and hydroxy terminated unsaturated diester, where said end-blocked acrylated urethane comprises a mixture of
  A. about 1 to about 2 parts of the reaction product of
    1. an ester, which comprises the reaction product of
      a. a polyol; and
      b. a mixture of
        1. maleic anhydride; and
        2. terephthalic acid or dimethyl terephthalate; and
    2. an end-blocked isocyanate which comprises the reaction product of
      a. a diisocyanate; and
      b. an end blocker; and 3. a monomer selected from the group consisting of acrylic monomer, N-vinyl pyrrolidone, and mixtures thereof;
B. about 2 to about 1 parts of the reaction product of
1. a polyol;
2. a diisocyanate;
3. an end blocker;
V. up to about 15% of a solution of about 60 to about 90 cresol formaldehyde resin dissolved in about 10 to about 40% monoacrylate, where said cresol formaldehyde resin comprises the reaction product of
A. a compound selected from the group consisting of m,p-cresol, resin grade cresylic acid, or a mixture thereof;
B. aqueous formaldehyde;
C. a suitable catalyst;
D. salicylic acid; and
E. a monomer selected from the group consisting of acrylic monomers, N-vinyl pyrrolidone, and mixtures thereof;
VI. about 1.5 to about 5% of a UV photoinitiator
VII. up to about 5% of an acrylated hexamethoxymethyl melamine which comprises the reaction product of
A. hexamethoxymethyl melamine; and
B. an acrylated urethane which comprises the reaction product of
1. a diisocyanate; and
2. a hydroxy acrylate; and
VIII. up to about 0.1% of a flow control agent.

* * * * *